T. G. WOLFE.
COTTON SEED MEAL COOKER.
APPLICATION FILED JULY 27, 1909.
980,039.
Patented Dec. 27, 1910.
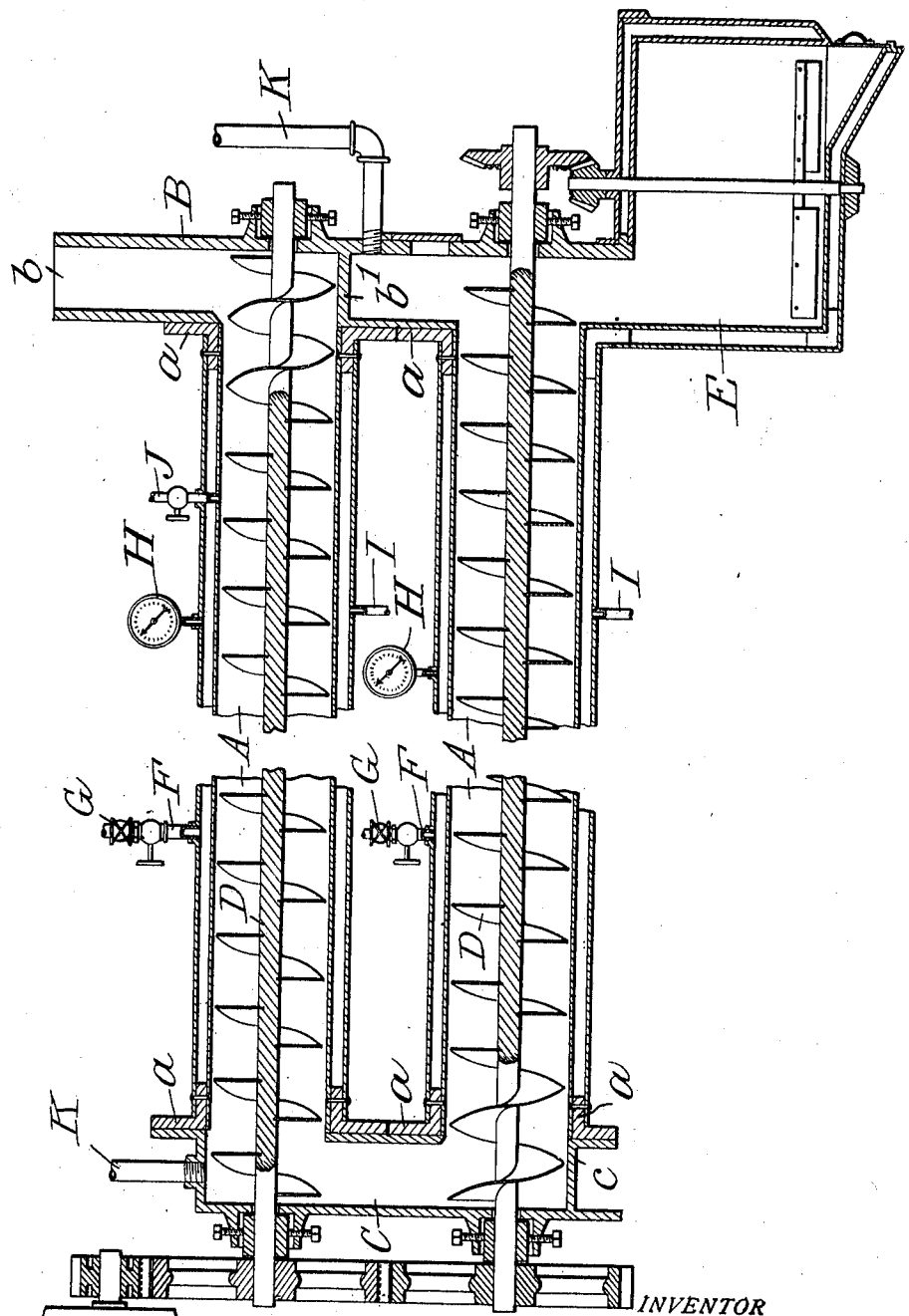

UNITED STATES PATENT OFFICE.

THOMAS G. WOLFE, OF OKLAHOMA, OKLAHOMA.

COTTON-SEED-MEAL COOKER.

980,039.  Specification of Letters Patent.  Patented Dec. 27, 1910.

Application filed July 27, 1909. Serial No. 509,801.

*To all whom it may concern:*

Be it known that I, THOMAS G. WOLFE, a citizen of the United States, residing at Oklahoma city, in the county of Oklahoma and State of Oklahoma, have invented certain new and useful Improvements in Cotton-Seed-Meal Cookers; and I do hereby declare the following to be a full, clear, and exact description of the invention, such as will enable others skilled in the art to which it appertains to make and use the same.

This invention relates to apparatus for cooking cottonseed meal and similar substances as it is fed along in a moving body or stream.

One object of the invention is to provide an apparatus whereby the meal is cooked by being passed through a plurality of heated passages and mingled therein with a tempering medium such as steam or water.

Another object is to provide in an apparatus of the character described, a plurality of connected cooking passages the temperature of each of which can be independently controlled and regulated.

A further object is to provide an apparatus having a plurality of communicating passages each heated by a surrounding column of a heating medium, the temperature of each passage being regulated independently and the apparatus being adapted for the introduction of a tempering medium such as steam or water into the substance being cooked.

In my method, the meal or other substance to be cooked is carried along and agitated in a series of heated passages, the temperature of each of which is controlled independently of the others, and a regulatable quantity of a tempering medium such as water or steam is mingled with the meal during its cooking.

The invention will first be described with reference to the accompanying drawings and then more particularly pointed out in the appended claims.

The drawing shows a vertical section through an embodiment of the invention in an apparatus capable of performing said method of cooking.

A, A denote cylinders forming passages for the meal, each cylinder being surrounded by an outer cylinder or jacket to provide a heating chamber around the inner cylinder. These cylinders may be of standard pipe of appropriate diameter, the outer pipe or jacket being spaced away from the inner one by flanged rings or collars $a$ inserted between the pipes at their opposite ends, and the pipes being fastened to the rings and made steam tight in any suitable manner, as by riveting and calking.

The jacketed cylinders are suitably supported at their opposite ends by hollow or chambered standards B, C to which the flanged rings $a$ are secured in any suitable manner. And within each cylinder A, a meal-agitating and conveying device is mounted. This device may comprise a rotatable spiral conveyer D the blades of which extend into the chambers of the standards B and C, the shafts of the conveyers being suitably mounted in the standards, and geared together to rotate oppositely when the blades of the conveyers incline in the same direction. The opposite ends of the cylinders A, A communicate with chambers in the standards B, C. These standards are formed to provide for feeding the meal to the front of the first cylinder, receiving it from the rear thereof directing it to the next cylinder and so on through the last cylinder from which it is discharged to a receptacle. To accomplish this, the standard B is formed with an open mouth $b$ that serves as a hopper whereby meal is fed to the chambered interior of said standard, a partition $b^1$ of which prevents the fall of the meal beyond the mouth of the first cylinder; and the standard C is provided with a similar partition $c$ which holds the meal discharged from the rear of the first conveyer in a position to be engaged by the rear of the conveyer of the second cylinder, and so on in accordance with the number of cylinders employed. The last cylinder discharges at its front end into the chambered interior of the standard B which communicates with a jacketed receptacle E that forms a receiver for the cooked meal.

Steam is conducted to the heating chambers surrounding the cylinders A by pipes F which are provided with cut off valves as shown and with suitable reducing valves G; and the heating chambers supplied by the pipes F are each in communication with a pressure gage H. The water of condensation in these heating chambers is led to a steam trap or traps (not shown) by pipes I.

J denotes a valve controlled pipe which communicates with the interior of the cylinder A and by means of which steam or water can be introduced into the meal therein for the purpose of tempering it.

K, K are pipes for venting the chambers of the standards B, C as shown.

Motion may be imparted to the conveyers by means of a spur gear, which is carried by a suitably driven shaft and which meshes with a gear on one of the conveyer shafts. The receptacle E for the meal may be provided with an agitator which may consist of a shaft rotatably mounted in the receiver and provided with stirring blades. The shaft of the agitator may be geared to one of the conveyer shafts as shown.

The operation, generally stated, is as follows: Steam is admitted into the heating chamber surrounding each cylinder A, the temperature of each of such chambers being regulated as desired by its own reducing valve. The meal to be cooked is then fed through the hopper $b$ to the first cylinder in which the meal is agitated and through which it is carried by the conveyer mounted therein. During its passage through the cylinder, the meal is partially cooked and is mingled with a tempering medium, steam or water, introduced into the meal through the pipe J. After its passage through the first cylinder the meal is discharged therefrom and drops to the second cylinder through which it is conveyed and further cooked as will be understood. If more than two cylinders A be employed, the meal will be carried through them in the manner heretofore described, and from the last cylinder, it will be discharged into the receptacle E, from which is can be removed to any standard former. It will be therefore understood that the process can be carried on through any number of cylinders; and that the meal can be retained in the cooker any desired length of time by simply varying the speed of the conveyers. As each cylinder is or may be under different steam pressure the moisture will not be abstracted from the meal after it is tempered no matter how many cylinders may comprise the cooker. This fact renders the invention particularly useful in preparing cotton seed meal for the extraction of its oil by pressure. The capacity of the cooker will depend upon the speed at which the conveyers are driven, the conveyers traveling at the same rate of speed.

Having described my invention, what I claim is:

1. An apparatus of the character described comprising a plurality of cylinders each having a surrounding jacket providing a chamber around said inner cylinder, front and rear standards supporting the cylinders and having interior chambers with which the cylinders communicate, vent means adapted for connecting the chambered interior of each standard with the atmosphere, means in each cylinder for agitating the meal and conveying it through the cylinder, a pipe for supplying a heating medium to the chamber surrounding each inner cylinder, and means on each of said pipes for independently controlling the temperature of each cylinder.

2. An apparatus of the character described comprising a plurality of passages each formed of inner and outer cylinders and flanged rings inserted between the cylinders at their opposite ends, the cylinders being fastened to said rings, front and rear standards to which said flanged rings are secured, the standards being formed with interior chambers communicating with the passages formed by said cylinders at their opposite ends, the front standard being formed with an open mouth or hopper and with a partition at the bottom of the first cylinder and the rear standard being formed with a partition at the bottom of the second cylinder, a rotatable spiral conveyer mounted in each inner cylinder and journaled in the standards, means for admitting a regulatable quantity of steam independently to the space surrounding each inner cylinder, a pipe communicating with the interior of an inner cylinder, means for venting the closed chambers of the standards, means for taking the water of condensation from the steam space surrounding the inner cylinders, a receptacle connected to one of the hollow standards in communication with the bottom chamber thereof, and a rotatable agitating device in the said receptacle.

In testimony whereof I affix my signature, in presence of two witnesses.

THOMAS G. WOLFE.

Witnesses:
A. E. KING,
J. E. LAWLESS.